United States Patent [19]

Cantwell

[11] Patent Number: 4,524,400
[45] Date of Patent: Jun. 18, 1985

[54] MAGNETIC TRANSDUCER POSITIONING APPARATUS

[76] Inventor: Gill Cantwell, 2434 Purdue Ave., Los Angeles, Calif. 90064

[21] Appl. No.: 462,740

[22] Filed: Feb. 1, 1983

[51] Int. Cl.³ .......................... G11B 5/55; G11B 21/08
[52] U.S. Cl. ...................................... 360/106; 360/109
[58] Field of Search ................... 360/106, 109, 75, 78; 74/567–569, 89.2

[56] References Cited

U.S. PATENT DOCUMENTS

| | | | |
|---|---|---|---|
| 3,818,500 | 6/1974 | Lemelson | 360/106 X |
| 3,859,662 | 1/1975 | Habich et al. | 360/106 |
| 4,131,923 | 12/1978 | Wachs et al. | 360/106 |
| 4,261,222 | 4/1981 | Dattilo | 74/569 |
| 4,270,155 | 5/1981 | Bejerano | 360/106 |
| 4,428,012 | 1/1984 | Applequist et al. | 360/106 |

Primary Examiner—John H. Wolff
Attorney, Agent, or Firm—Nilsson, Robbins, Dalgarn, Berliner, Carson & Wurst

[57] ABSTRACT

A movable carriage carrying magnetic transducer head is positioned at predetermined points adjacent a floppy disc surface for appropriate reading/writing of data thereon. The transducers are positioned by a permanent magnet stepping motor which rotates a cam shaft. The cam surfaces on the shaft drive a plurality of balls into engagement with opposed racks defining "V"-shaped notches of different pitches formed on a surface of the carriage and on a fixed surface adjacent thereto. As the balls sequentially enter the "V"-shaped notches, they force individual pairs thereof into alignment, the carriage and thus the transducer means are sequentially and discretely positioned at predetermined data track positions on the floppy disc.

24 Claims, 11 Drawing Figures

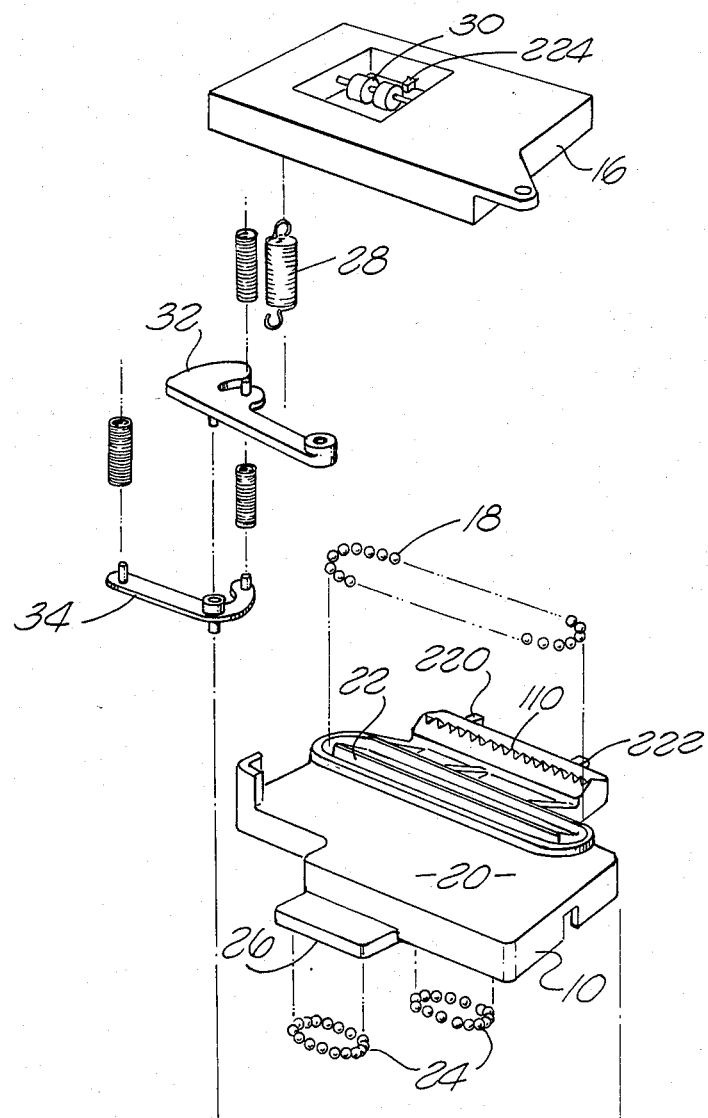
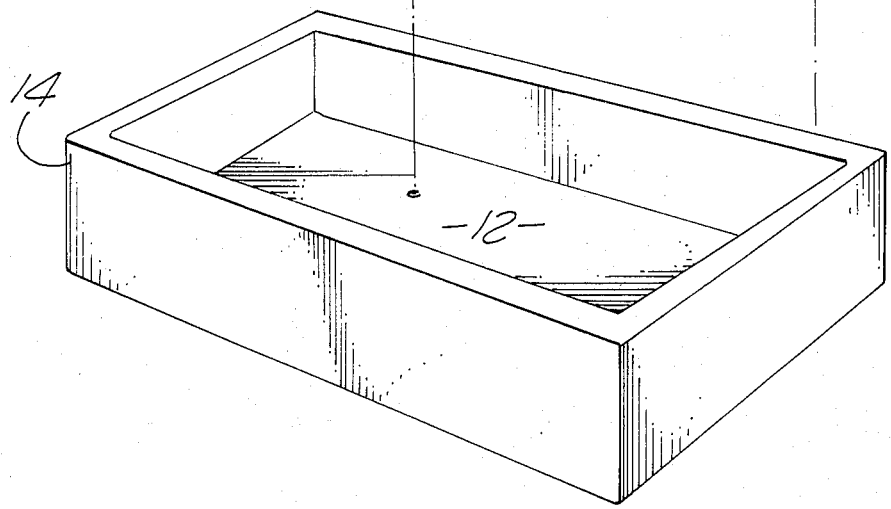
FIG. 1

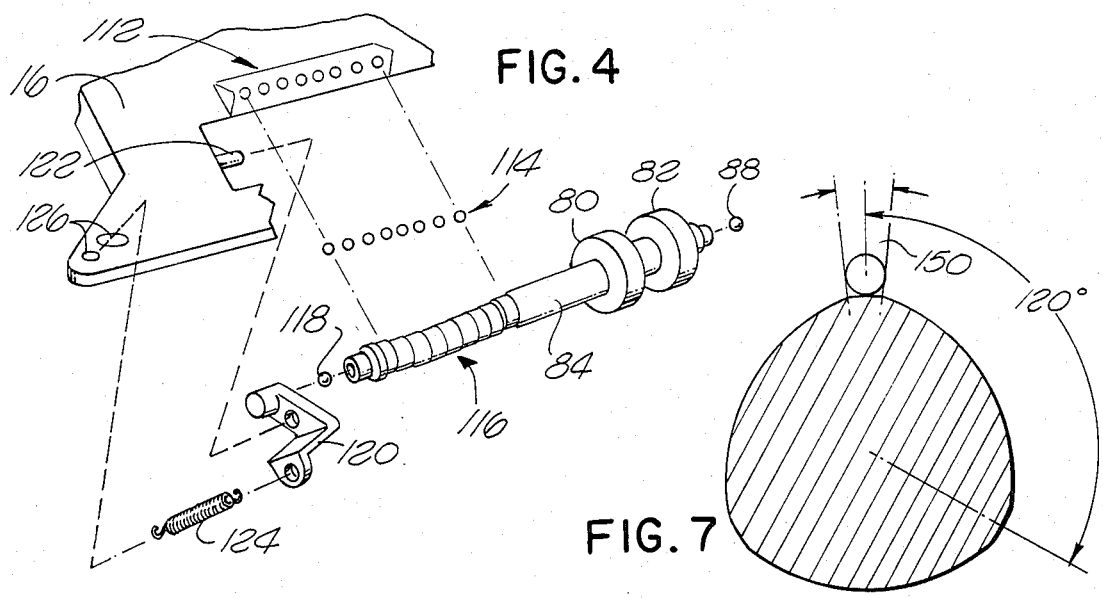
FIG. 4
FIG. 7
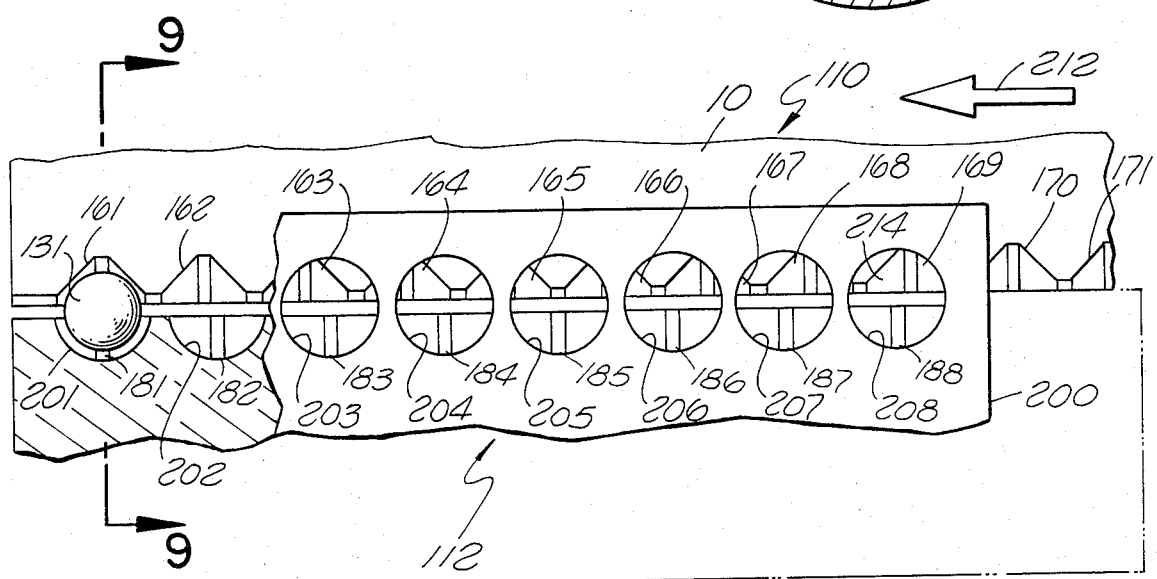
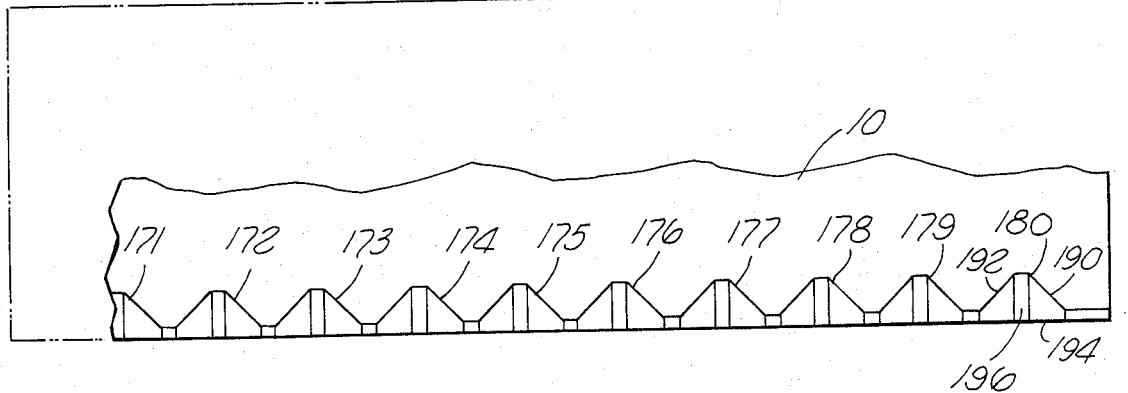
FIG. 8

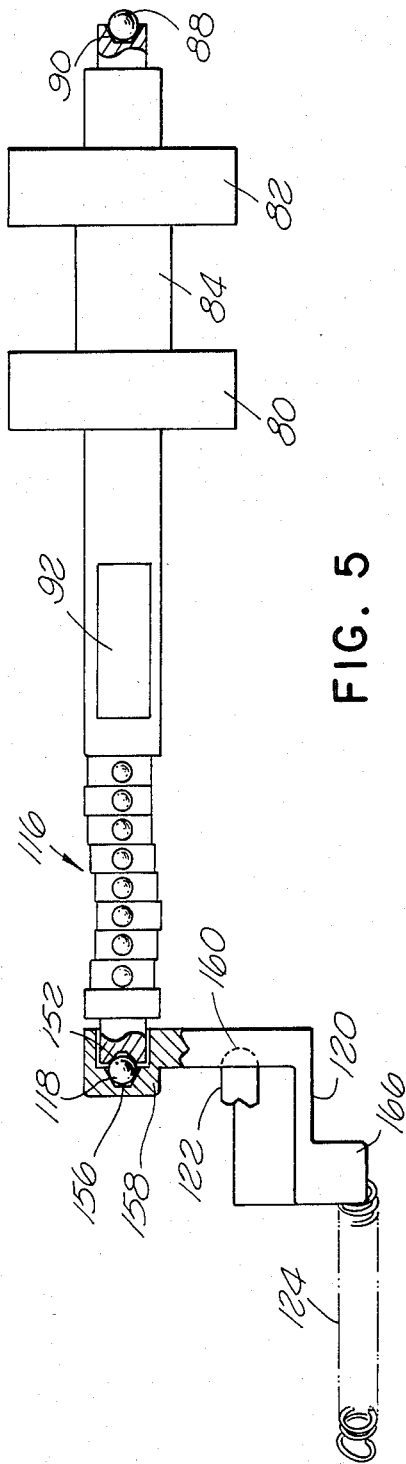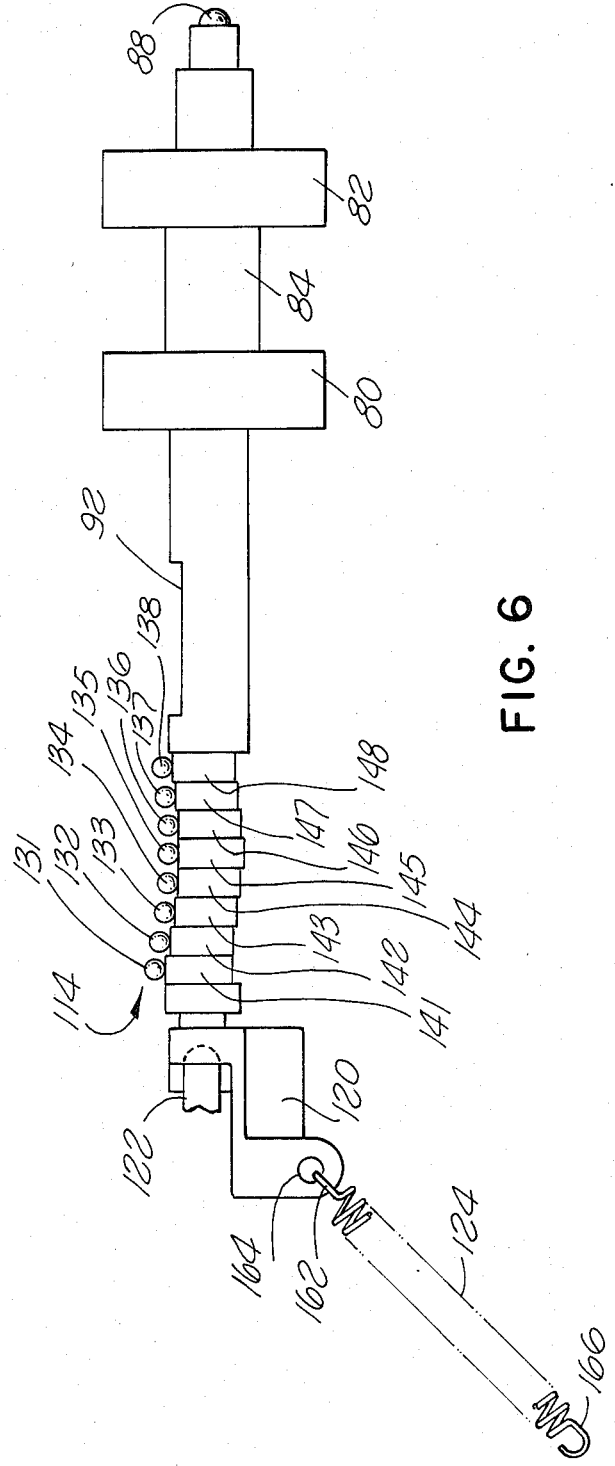

MAGNETIC TRANSDUCER POSITIONING APPARATUS

FIELD OF THE INVENTION

This invention relates to apparatus for positioning magnetic transducers in data storage systems and more particularly to such apparatus for precise location of magnetic transducers with respect to rotating flexible magnetic recording media (floppy discs) for reading/writing data thereon.

BACKGROUND OF THE INVENTION

The most common positioning system used in prior art expensive drives, is the moving coil system in which a multi-turn electromagnetic coil is mounted on the carriage and positioned in a flux gap of a fixed, permanent magnet structure. By controlling the polarity and amplitude of current flowing through the coil, a thrust of controlled magnitude and direction is generated. A second element of this system is a position encoder attached to the carriage which is usually optical, but occasionally inductive. Electronically controlled forces generated by the electromagnetic coil are used to guide the carriage to the positions indicated by the position encoder. Most of these systems also require a velocity transducer to sense the velocity of the carriage. Because of the many elements of this closed loop system, it is quite expensive and therefore it is not economically competitive for very low cost positioners such as those used in the typical floppy disc drive.

In low cost drives, open loop systems are preferred, in which a positioner moves directly to inherent, predetermined discrete positions with no electronic verification that the desired position has been reached. Such systems cost little and work well provided their torque and inertia limits have not been exceeded.

The simplest of these open loop systems is a linear stepper. One version in commercial production utilizes a long cylindrical armature of soft iron attached to the carriage upon which the transducers are mounted. Into this armature are cut circumferential grooves, 16 to the inch. Around this armature, and separated from it by only a narrow air gap, is an electromagnet coil structure with soft iron pole pieces with matching circumferential grooves, 16 to the inch. When a current is applied to this coil, the system becomes a variable reluctance motor which seeks the position of least reluctance and the armature and carriage are moved until the grooves are aligned. A second coil structure, identical to the first, is positioned 1/48 of an inch out of phase with the first, and the third identical coil structure is positioned 1/48 of an inch out of phase with the first but in the opposite direction from the second. By turning on the current to the second coil and turning off the current to the first, the armature will be induced to move 1/48 of an inch. By turning on current to the third coil and turning off the second, the armature will move an additional 1/48 of an inch and so forth. By properly sequencing the current to the three coils, this linear stepper system can be directed to any of the 48 positions per inch defined by the three coil structure.

One drawback of linear steppers of the type above described is that the armature material must be chosen for its magnetic properties rather than for the desired rates of thermal and hygroscopic expansion. Consequently, the pitch of the linear stepper varies with the materials expansion and contraction rates as the ambient temperature and humidity changes.

Another problem is that the electromagnetic coils must be positioned in close proximity to the armature, and the substantial heat generated by their operation expands and distorts both their supporting structures and the length and pitch of the armature. When one coil is turned on for any substantial length of time, for example to hold the transducers in a desired position, that portion of the armature adjacent the active coil is being heated while other portions are cooling. When the motor is sequenced to another position, another coil begins heating a different portion of the armature, and the motor changes its thermal and dimensional nature over a period of time.

In a motor such as this, the air gap must be wide enough to prevent even momentary physical contact between armature and stator. In addition, the carriage guidance system must have great lateral stiffness, for as the armature deviates from a central balanced magnetic position, magnetic attractions decline slightly on the wide gap side, but increase greatly on the narrow gap side. This increasing imbalance pulls the armature even further off center. To oppose these forces requires a stiff armature, very stiff guidance means, and a sufficient air gap.

To achieve reasonable efficiency, the size of the teeth in the magnetic structure must be proportionally bigger than the air gap. As the teeth become very small relative to the air gap, their interaction across the air gap becomes negligible. Consequently, linear stepper motors are not suitable for fine pitch systems such as 96 increments per inch of storage on the disc.

A further problem with linear stepper motors, is the large mass of their armatures. Moving this mass imparts substantial kinetic energy to the system, which must be removed, primarily by mechanical friction, before the system comes to rest. This requires a long settling time while the carriage oscillates about the desired position and comes to rest which causes relatively long delays before the system is ready for data transfer operations. Additionally, since the system is not balanced, the heavy armature becomes a substantial burden to be driven "uphill", if the carriage travel is not exactly horizontal.

To overcome some of the foregoing problems, rotary stepping motors in conjunction with some means to convert the rotary motion to linear motion have become widely used in the prior art as transducer positioners in low cost drives.

Because the magnetic structure is fairly compact, narrow air gaps can be achieved. When the structure expands due to heat generation, the expansion is equal in all directions, therefore the output which is angular in nature, is not distorted. Ball bearings provide a reasonably stiff support to resist unbalanced magnetic forces.

Rotary stepping motors have a number of limitations, among which are dead band and oscillation The static friction of the system defines a zone called the dead band, in which the motor has insufficient torque to initiate motion. Therefore, if the armature comes to a stop anywhere in the dead band, it will remain at that position. To minimize this positional indeterminancy, the motor's torque must be maximized, and the static friction minimized. If the friction load is very low, then the energy stored in the moving armature causes it to oscillate about its terminal position for unacceptably long periods. To reduce settling times to an acceptable level, a moderate amount of friction must be present, which in turn increases the dead band.

Another weakness in stepper motors used as precision positioners is pole shift. Two kinds of stepper motors are possible. The variable reluctance type utilizes magnetically soft iron structures in which magnetism is selectively induced by electromagnetic coils. The permanent magnet type utilizes magnetically hard material to permanently induce magnetism in magnetically soft iron structures, while additional magnetomotive forces are selectively generated by electromagnetic coils. Ideally the permanent magnets in such devices should be infinitely hard magnetically, and the magnetically soft structures should be infinitely soft magnetically. These ideals are not possible, and in low cost motors, the choice of material for magnetic structures is heavily influenced by cost, and magnetic hardness is not the primary concern. The magnetically soft structures, which should ideally be manufactured of ingot iron or electromagnet steel, are more often, for cost reasons, manufactured of low carbon steel. They are also generally stamped and formed without subsequent annealing. They are also frequently electroplated in baths that can add carbon to the steel. For all of these reasons, the supposedly magnetically soft structures in low cost motors are frequently moderately hard magnetically.

As a result, the magnitude and polarity of magnetism in portions of the magnetic structures and particularly, portions of the soft iron structures, are slightly and temporarily altered during operation. Consequently, if a rotary stepping motor, with holding current applied to one of its coils, is mechanically deflected a few degrees clockwise from that null point, and the mechanical torque is then slowly released, the motor will return to a null position. During this deflection, magnetomotive forces from the coil in combination with magnetomotive forces in the magnetically hard and soft structures, impresses a pattern of magnetic flux on the structure which is constantly changing until the system comes to a stop indicating that the internal forces are balanced. If the motor is then mechanically deflected a few degrees counter-clockwise from that pole position and the mechanical torque again slowly released it will return to a new null position far removed from the original null position. A small portion of this change in null position or "pole shift" was due to the width of the dead band, but the majority of this shift was due to the creation of a different pattern of magnetism, which resulted in a new point of balanced forces. The positional indeterminancy in low cost stepper motors due to pole shift, is typically on the order of 3% of a full step which can radically affect data storage.

Another problem with the use of low cost stepper motors as precision positioners, is the loose tolerances applied to their fabrication and assembly. Positional errors of 5% of a step or more from this cause are not uncommon.

In order to achieve a small dead band, high torque is required, which means the highest possible ampere turns in the electromagnetic coils. For a given volume available for the copper magnet wire, a trade off is made between ampere turns and the greatest heat build up that can be tolerated. Consequently, stepper motors are major heat sources, and unlike rotating motors that assist in cooling themselves by generating windage, the stationary stepper conducting a holding current through one of its windings becomes quite hot. To alleviate this heat problem, some drive circuits incorporate a time delay to reduce the normal drive current to a lower holding current after the motor has stopped for a specific time interval. This approach reduces the heat build up, but it increases the potential dead band width, and assumes that the armature has already come to rest within the original high current dead band, and that subsequent shock, vibrations, etc., will not deflect the armature into the new, wider, low current dead band. Although permanent magnet type steppers possess a low level of torque when no current is flowing through the coils, this has not been sufficient in prior art to permit turning off the holding current entirely.

A number of means have been devised in prior art for converting the rotary motion of the rotary stepper motor into linear motion. One of these is a spiral face cam mounted on the stepper motor shaft. A spherical follower attached to the carriage, is spring biased into the spiral "V" groove of the face cam. As the stepper motor rotates the spiral cam, the follower moves radially and the carriage thus moves lineally with it. When the follower is close to the axis of the spiral cam, the friction between the follower and the cam, as well as the reaction to the inertia and friction of the carriage, are all acting at a small radius, (moment arm) and therefore, the torque loads on the stepper motor are small. Consequently, damping is minimal and settling times are long. Conversely, when the follower reaches the outer portions of the spiral cam, the torque loads on the stepper are large, and the dead band is excessive.

Another problem with the spiral cam, is its close proximity to the stepper motor. Heat from the stepper motor is conducted through the motor shaft into the spiral cam. When the drive is first turned on, the stepper and cam are cold. Data written on the cold drive is located in the position dictated by the cold spiral cam. After the drive has been operating for a time, the spiral cam has been expanded by heat from the motor. The transducer directed to the same nominal data position will instead be displaced by the amount of thermal expansion.

Another problem with the spiral cam, is that it is positionally referenced from the stepper motor itself. Since the motor is a major heat source, the structure to which the motor is mounted becomes heated and dimensionally distorted by that heat. This distortion changes the basic reference point from which the carriage position is derived. As a result, spiral cams are not used in the more precise drives.

Another prior art design uses a miniature ball bearing cam follower which runs against a spiral face cam. A small extension spring biases the cam follower against one side of the face cam.

This design adds the inaccuracies of the cam follower to the other inaccuracies of the spiral cam approach. Also the extension spring acting against the slope of the cam applies a biasing torque against the motor. This torque works against the motor in one direction as the motor extends the spring and thus stores energy in the spring. In the other direction, the motor is augmented by the energy released by the relaxing spring. In an open loop stepper system such as this, such augmentation is particularily unwelcome, since the stepper must be operated at a much slower rate to avoid accidentally over accelerating and loosing proper synchronism. This is particularily a problem in this design due to the small amount of damping friction provided by the ball bearing cam follower which also causes substantial settling times.

Another prior art means of coupling a rotary stepper to a linear carriage has been a lead screw. In this mechanism, the stepper motor shaft is elongated several inches, and a helical groove or thread is cut into the surface of the shaft. A follower attached to the carriage is spring biased into this groove.

To achieve sufficient accuracy in this lead screw, the helical groove must be precision ground. To keep the polar inertia of the system low, the shaft diameter must be small. As a consequence, the depth of the ground groove is a substantial percentage of the shaft diameter, and the unbalanced stresses created by the asymetrical grinding on the periphery of the shaft distorts it, and maintaining lead screw straightness becomes a problem. Some lead screws are ground with a double pitch thread to create symetrical, balanced stresses to improve straightness.

The thread grinding process by which these lead screws are manufactured is a sequential process. The entire thread cannot be produced at the same time. Instead, the grinding wheel is first plunged into the material at one end of the thread, and then follows the helical path of the thread until reaching the opposite end of the thread, it is retracted. Heat is generated during the grinding process. Although an attempt is made to standardize the temperature of the blank shafts, the grinding wheel, and the cutting oil, nevertheless the shaft gains temperature during the grinding operation. Consequently, since the pitch of the ground thread is maintained as a constant during the grinding operation, after the part is completed and its temperature becomes equal along its length, the pitch at the beginning end of the ground thread is greater than the pitch at the completion end of the thread. This is because the pitch at the completion end was ground into a warmer expanded shaft which has since contracted and with it the pitch of the thread ground into its surface has contracted. Finishing the thread with a very light second grind could largely eliminate this problem, but is not economically practical in low cost applications. Even though the crudest form of thread grinding is used, these ground lead screws contribute substantially to the cost of the drives.

Since the lead screw is an extension of the motor shaft, the substantial heat of the stepper motor is conducted down the shaft, and radiated from the shaft. The result is a heat gradient down the length of the shaft. When the drive is first turned on, the pitch of the lead screw is as manufactured. After the drive heats up, the pitch is expanded greatly near the motor, and to a lesser degree at the end away from the motor. This loss of positional accuracy due to motor heat is independent of a similar loss of accuracy due to changes in ambient temperature. As the ambient temperature changes, the dimensions of the data disc, which is fabricated from biaxially oriented polyethylene terephthalate, change also. Ideally the changes in pitch of the lead screw from ambient temperature changes should match the changes in pitch of the data tracks from the same cause. This has not been accomplished in the prior art, and for practical manufacturing reasons, lead screws have been fabricated from stainless steel with thermal expansion rates different from that of the data discs.

In some designs the stepper motor becomes the point of reference from which the carriage is positioned by the lead screw. Since the stepper is a major heat source, this heat from the motor conducts into the structure to which the motor is attached, and through thermal expansion distorts that structure, thereby changing the reference point from which positioning begins and shifting the carriage position.

To eliminate this problem, and to minimize the effects of stepper motor heat on the lead screw accuracy, some designs float the motor on a flexible support, and reference the opposite end end of the lead screw. In these designs, the portion of the lead screw furthest away from the motor and therefore the coolest, is used for positioning the carriage, and since it is fairly cool, it creates only a small amount of distortion from thermal expansion in the structure to which it is attached. The drawbacks to this system are added complexity, and in some cases troublesome, once-around, elastic torque loads are generated. In those systems, three bearings are mounted on a slightly curved lead screw, and the motor which contains two of those bearings is supported on an elastically flexible mount. As the curved lead screw rotates, the motor is forced to wobble with it, and in the process alternately stores and releases energy in the elastically flexible mount. This alternating spring biasing of the torque output has the same negative effects as the extension spring in the face cam drive.

In this system, since the motor is flexibly mounted, rather than directly mounted to a solid supporting structure such as a cast chassis, the heat sink effect of such a chassis is lost, and since the flexible mount usually has less thermal conductivity, the stepper motor warms to a higher temperature, as does the lead screw. Thus, the thermal expansion of the lead screw pitch is even greater in this system.

When the biaxially oriented polyethylene terephthalate disc changes size in response to a change in ambient humidity, it is preferred, that the pitch of the lead screw would change by the same amount. Since the lead screws in prior art have been manufactured from stainless steel which is dimensionally unaffected by changes in humidity, no such hygroscopic compensation in the pitch of lead screws has been accomplished.

A further difficulty in lead screw designs is the proper tracking of the lead screw by the follower. In order for the follower to exactly duplicate the pitch of the lead screw, it must move exactly parallel with the axis of the lead screw. If the lead screw were exactly straight, this would present a substantial alignment problem, and since due to manufacturing limitations, the lead screws are frequently slightly curved, the problem is worse.

In the prior art, an attempt is usually made to minimize this alignment problem by mounting the carriage on the lead screw itself by means of a pair of bearings in addition to the follower which rides in the ground thread with these extra bearings riding frictionally against the outside diameter of the lead screw. As a result, the carriage moves laterally and vertically in response to rotation of the somewhat curved lead screw as a whole, while departures from proper pitch by the follower are limited to those caused by curvature of the lead screw only in the length between the two supporting bearings.

The addition of these extra carriage support bearings adds substantially to the frictional torque load which must be driven by the stepper motor, and that in turn increases the dead band.

Some of these lead screw designs utilize a 90 degree "V" thread profile, in which case when the carriage reaches the end of its travel, the follower is driven out of the thread without harm to the system. Other designs use 60 degree Acme thread profiles, and when the carriage in such a system is driven to the end of its travel, destructive forces are generated by the lead screw. Such systems are generally augmented by mechanical stops which impact a rotating element on the lead screw against some portion of the carriage to provide a less destructive stopping means. These stopping means still create high rates of deceleration, and large forces in the structure, and are a cause of failures and misalignments.

The third means of coupling the rotary stepper to the linear carriage in the prior art has been a flexible band. In this design, a cylindrical drum or capstan is mounted on the shaft of the stepper motor. A thin, flexible metal band encircles the capstan and is attached to the capstan at the midpoint of the band. By this means, when the stepper motor rotates, the flexible band moves with it carrying the carriage along as well.

The magnitude of movement of the carriage is a function of the pitch radius of the flexible band, which is the outside radius of the capstan plus one half of the band thickness. A problem with this design is that the capstan mounted directly onto the stepper motor shaft is heated by the motor and thermally expands, thus increasing the pitch.

Another problem is that the portion of the band that is wound around the capstan assumes nearly the same temperature as the capstan, while that portion of the band lying away from the capstan does not. As a result, when a hot capstan turns, it unwinds hot and therefore thermally expanded metal band, and winds in cool and therefore contracted metal band. After the capstan stops at the newly selected position, the hot newly unwound band begins to cool and contract. At the same time the cool, newly wound band draws heat from the capstan and begins to warm and expand. Tne result is that initial positioning by the stepper is exaggerated, followed by a slow correction as thermal equilibrium is again established.

Another weakness in this system is that the stepper motor is the basic reference point from which positioning is established, and the heat from the stepper motor is conducted into the supporting structure, thermally expanding and distorting it, thus changing the reference point and therefore the carriage position.

The capstan in such a system is a precision part, the diameter and concentricity of which must be very accurately established to closely coincide with the nominal pitch value. Consequently, existing designs have fabricated this part by precision grinding a metallic part. Ideally this part should expand thermally at the same rate as the biaxially oriented polyethylene terephthalate data disc to achieve exact compensation for changes in ambient temperature. The materials used for capstans in the prior art do not achieve this goal.

It is also desirable, that the capstan expand hygroscopically at the same rate as the disc, but this too has not been achieved in the prior art mechanisms. The metallic capstans are totally unaffected dimensionally by changes in humidity, and so the changes in data ring pitch are completely uncompensated.

Another problem with this design, is the short life of the flexible band. The maximum practical number of steps that can be provided in a stepper motor is approximately 200 per revolution. In order to couple such a 200 step motor to a 96 track per inch carriage, the capstan must have a pitch radius of 0.3316 inches. In order to flex the band around such a tight radius, even for a small number of cycles, the band must be very thin, stresses are high, and service life is limited. Because of these limitations, further pitch reductions are not practical with this system. A further limitation is the requirement, that the capstan must turn somewhat less than a full turn, otherwise the flexible band would start to wind on top of itself.

If the carriage in such a system is run to the end of its travel, and the rotating motor is stopped suddenly by the flexible band, it is overstressed and breaks the band. Consequently, stops must be added to the motor to limit its rotation. When the motor is run at full speed into one of these stops, rapid deceleration occurs. This sudden deceleration is conveyed to the carriage by means of the flexible band, and as the momentum of the carriage is suddenly applied to the band, high stresses are generated. The elements of this system are precise, fragile, and easily damaged during assembly.

OBJECTS AND ADVANTAGES OF THE INVENTION

It is an object of the invention to produce a low cost positioner that can be assembled from inexpensive injection molded plastic parts.

It is a further object, to provide for easy assembly without skilled labor, or expensive tooling.

It is a further object, to provide precise positioning and eliminate the positional indeterminancy of dead bands.

It is a further object, to provide movement to a selected position without overshoot.

It is a further object, to eliminate oscillations around the selected position, and by so doing enable the drive to transfer data immediately upon arrival of the transducer at the selected data track.

It is a further object, to provide positional accuracy which is not degraded by pole shift phenomena.

It is a further object, to reduce power consumption and heat generated in the drive, by providing a means for precisely maintaining a selected position without a holding current.

It is a further object, to provide substantial thermal isolation between the heat generating components of the positioning system, and the precision elements that determine the geometric positions.

It is a further object, to provide an incremental positioner whose pitch changes with changes in ambient temperature, and which approximates the thermal expansion of biaxially oriented polyethylene terephthalate.

It is a further object, to provide an incremental positioner whose pitch changes with changes in ambient humidity, and which approximates the hygroscopic expansion rate of biaxially oriented polyethylene terephthalate.

It is a further object, to provide a positioner which can be quickly and easily aligned to a standard position without special skills.

It is a further object, to eliminate tightly toleranced motor parts and narrow air gaps.

It is a further object, to eliminate movement of motor coils as a means of adjustment, and thereby permit installing those coils as fixed, permanent elements on a printed circuit board.

It is a further object, to eliminate mechanical stops on rotating elements, and permit unlimited rotation with automatic decoupling of the carriage should the carriage reach the end of its travel, such uncoupling to be accomplished without damage to components and subject to automatic recoupling when excessive rotation has ceased.

It is a further object, to provide an incremental positioner capable of moving in very small increments.

It is a further object, to provide a positioner with a long service life.

SUMMARY OF THE INVENTION

A transducer positioning device which includes a movable member affixed to the magnetic transducer and having a plurality of force receiving surfaces of a first predetermined spacing. Positioned adjacent the movable member is a fixed member having a second plurality of force receiving surfaces of a second predetermined spacing, the second predetermined spacing being different from the first predetermined spacing. Driving means is disposed adjacent the fixed and movable members and includes apparatus for moving the driving means into simultaneous engagement with the first and second surfaces for aligning at least one of the movable surfaces with one of the fixed surfaces for aligning the same.

BRIEF DESCRIPTION OF THE DRAWINGS

FIG. 1 is an exploded schematic illustration of a transducer positioning apparatus constructed in accordance with the present invention;

FIG. 4 is a fragmented exploded schematic illustration of a portion of the apparatus illustrated in FIG. 1;

FIG. 5 is a plan view illustrating the drive mechanism used in the transducer positioning apparatus of the present invention;

FIG. 6 is an elevational view of the structure shown in FIG. 5;

FIG. 7 is a cross-sectional view illustrating one of the cam details;

FIG. 8 is a fragmented view partly in cross-section illustrating the relationship between the moving rack and the fixed rack constructed in accordance with the present invention;

DETAILED DESCRIPTION

Figure 2:
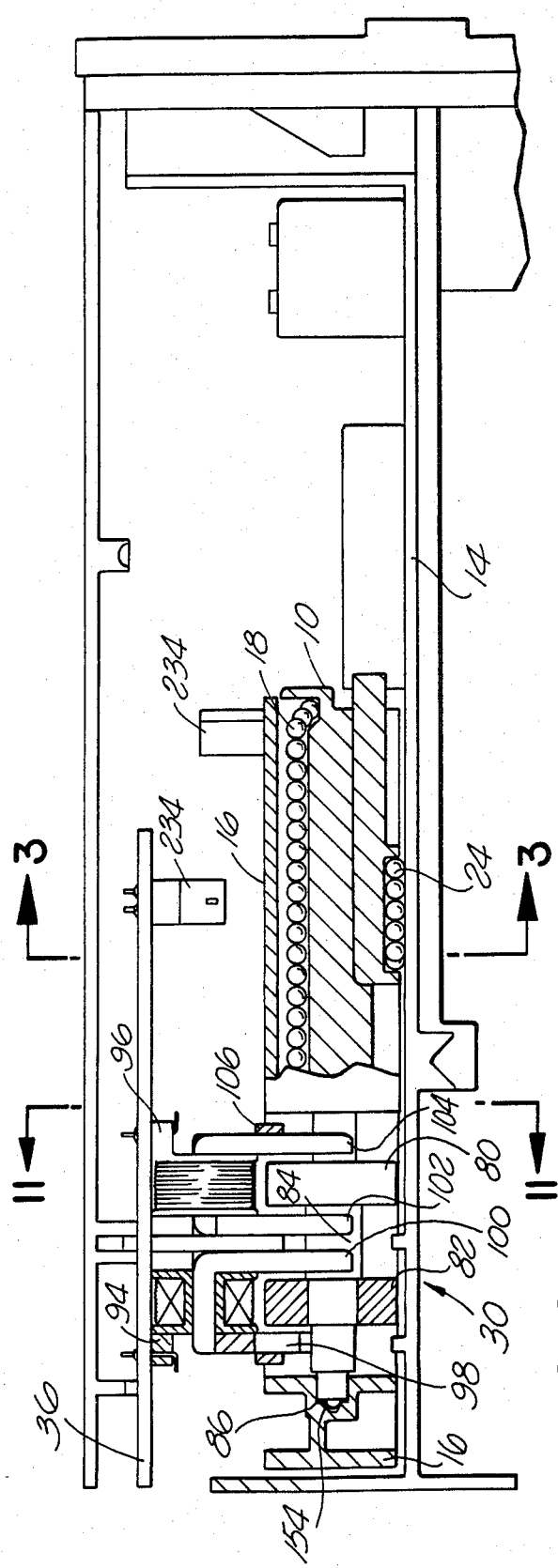
FIG. 2 is a cross-sectional view illustrating the positioning apparatus in assembled form.

The transducer positioning apparatus of the present invention is particularly designed for the precise positioning of the magnetic transducer heads of a floppy disc for reading/recording thereon as is well known in the art. However, the structure may have applications other than the positioning of transducer heads such, for example, as wherever it is desired to accurately position a structure utilizing a minimum amount of force in doing so. Generally, the apparatus to be positioned is effectively floated between a plurality of balls which are held on opposite sides thereof within continuous track means. Pressure is applied to keep at least some of the balls in contact with the opposite surfaces of the device to be positioned while force is applied through appropriate motive means to the device to cause it to move to the desired predetermined position. In the preferred embodiment, a plurality of balls are discretely forced, one at a time into opposed "V" shaped notches formed by a pair of spaced apart racks, one fixed and the other movable. The balls ride upon a plurality of cams mounted on a shaft turned by a motor responsive to electrical signals applied thereto.

As is illustrated in FIG. 1 there is provided a carriage assembly 10 which is sandwiched between the bottom surface 12 of a chassis 14 and the inner surface (not shown) of a support assembly 16. A first group of balls 18 is positioned upon one surface 20 of the carriage assembly 10 and follow a channel or groove 22 formed therein. A second plurality of balls 24 are positioned on the opposite surface 26 of the carriage 10 and are retained within a groove or channel (not shown) formed therein. A biasing means such as the spring 28 is interconnected between the support member 16 and the base 12 of the chassis 14, thus completing a continuous track within which the balls 18 and 24 travel. A means for applying force to move the carriage 10 may take the form of a motor 30 which is held within the support assembly 16 and is interconnected by means (not shown) to the carriage 10. Appropriate adjusting mechanisms 32 and 34 are positioned intermediate the support member 16 and the chassis 14 to properly adjust the positioning of the various elements contained therein.

As is shown in FIG. 2, the carriage 10 is sandwiched between the chassis 14 and the support member 16. The balls 18 are held in position between the carriage 10 and the support member 16 while the balls 24 are held in position between the opposite surface of the carriage 10 and the chassis 14. The motor is shown generally at 30 and is held in place by the support member 16 with appropriate power and control signals being applied to it through circuits positioned upon printed circuit board 36. The details of construction of the motor and the printed circuit board are set forth below.

Figure 3:
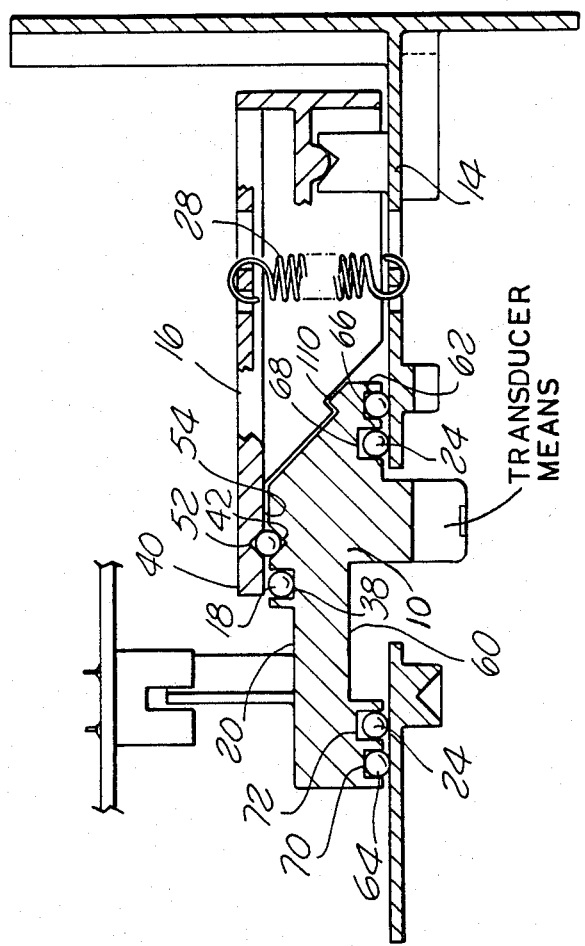
FIG. 3 is a cross-sectional view taken about the lines 3—3 of FIG. 2.

As is illustrated in FIG. 3, the carriage 10 forms on the surface 20 thereof, the continuous channel 22 within which the balls 18 are positioned. Preferably the carriage 10 is made from a glass-filled, polycarbonate plastic which has been appropriately molded. It should be understood, however, that the carriage 10 may be constructed from any material which is desired. As is illustrated, the channel 22 contains one section which functions as a return section for the balls and is formed as a generally U-shaped section 38 which is depressed further into the surface 20 of the carriage 10. The U-shaped section or portion of the channel 22 is formed in such a manner that the balls 18 are freely movable within the channel but, at the same time, are restrained so that they remain within the tract. It should be noted that the arms of the U-shaped channel are effectively closed by the end section 40 of the support member 16, thereby trapping the balls internally within this portion of the track so that they cannot be dislodged therefrom. A second section of the track is formed effectively by a V-shaped channel 42 within which the balls 18 are positioned.

The balls are firmly retained in an opposed V-shaped groove 52 formed in the surface 54 of the support member 16 by force generated by the spring 28 interconnected between the support members 16 and the chassis 14. As will be noted, the support member 16 is fixed relative to the carriage 10 and the groove 52 formed therein thus also remains fixed. As a result, the groove 52 provides the defined path along which the carriage 10 moves responsive to the force being applied thereto.

As the carriage moves the balls 18 contained within the track 22 are thus circulated.

On the opposite surface 40 of the carriage 10, there is provided a pair of curved channels 62 and 64 within which the balls 24 are permitted to continuously and freely circulate. As is noted, the channel 62 is generally U-shaped in cross-sectional configuration with one surface thereof 66 being depressed slightly less than the other surface thereof 68 into the surface 60 of the carriage 10. As a result, the balls 24 which are within the section 66 are in contact with the chassis 14 while the balls within the section 66 are restrained within the channel by the chassis 14 but are not contacted by it. As a result only the balls which contact the chassis 14 have a force applied thereto. A similar interaction is provided for channel 64 as shown at 70 and 72 and functions in the same manner.

As will be clearly recognized by those skilled in the art, through the application of force to only a portion of the balls 18 held within the continuous tracks on opposite surfaces of the carriage 10, only a minimal amount of friction is generated. Through such controlled application of force and by balancing the channels on opposite surfaces of the carriage so that a force is applied effectively to the center of the carriage on one side and at opposite ends on the other, the carriage effectively "floats" between the support member and the chassis upon a minimal number of the balls and can be thus easily moved through the application of a minimal amount of force. Through such capability the motor 30 can be a relatively low power motor which generates relatively little heat.

The carriage 10 is moved through forces applied thereto in a manner that will be described fully hereinbelow. The forces are generated through the utilization of the motor 30 as shown in FIG. 2. The motor 30 includes a pair of magnets 80 and 82 which are mounted upon a shaft 84. The shaft 84 is mounted for rotation within a recess 86 of the support member 16. The recess 86 receives a ball 88 which is held in place within a conical depression 90 formed in the end of the shaft 84.

The magnets 80 and 82 are ceramic magnets which have been cemented to the cam shaft 84 to hold them in place. A rotary orientation flat 92 is provided in the shaft 84. The flat 92 is utilized to assist in clamping the shaft 84 into an appropriate angular position in a magnetizing tool where a desired number of flux zones are induced into each of the two magnets 80 and 82. In accordance with the preferred embodiment of the present invention, twelve such flux zones are induced into each of the magnets 80 and 82.

The printed circuit board assembly 36 (FIG. 2) includes two bifilar wound coil bobbin assemblies 94 and 96. Each of the bobbin assemblies 94 and 96 encircles two soft iron positioner stators 98 through 104. These stators are held in place by a stator clip 106. When thus assembled, the driver motor 30 comprises a twenty-four steps per revolution permanent magnet stepping motor. The magnetic flux zones in the magnets 80 and 82 are oriented such that for each of the twenty-four step positions of the motor the carriage 10 is moved a discrete amount in a manner as more fully described hereinbelow.

As is shown in FIG. 1, the carriage 10 has formed on the surface 20 thereof a rack 110. The rack 110 is disposed adjacent the support member 16 as more clearly seen in FIG. 3. As illustrated in FIG. 4, the support member 16 also has a rack 112 formed thereon. A plurality of balls shown generally at 114 are positioned so as to be retained loosely within the rack 112. The shaft 84 has formed thereon a plurality of cams shown generally at 116 and is disposed to rotate upon bearings in the form of balls 88 and 118 which are appropriately supported at one end in the recess 86 and at the other upon the armature pivot support 120 which in turn is supported upon the projection 122 of the support member 16. The armature pivot support 120 in turn is secured by a spring 124 within openings 126 provided on the support member 16. As the cams 116 are rotated by the motor 30, the balls 114 are each discretely moved into contact with the racks 112 and 110. The racks 110 and 112 define the opposed notches with different pitches in each rack and are aligned in such a manner that one ball at a time will position the rack formed on the carriage 10 with respect to the support member 16 thereby causing the entire carriage 10 to move a discrete amount. As the shaft 84 rotates, a different cam forces a different ball discretely into joint engagement with the two racks thus again moving the carriage relative to the support 16.

Additional details of the cam assembly and its structure are shown in FIGS. 5 and 6. As is therein illustrated, the balls 114 are eight in number 131 through 138 and each is disposed in contact with one of the cams 141 through 148, also eight in number. Preferably, the shaft 84 with the cams 116 formed thereon is constructed from an integral unitary member of molded polyamide plastic. Each of the cams 141 through 148 has a three lobe profile as shown in FIG. 7. Each of the high spots on the cam has a ten degree area of constant radius as shown at 150. Each of the cams is also rotated 15 degrees relative to an adjacent cam on the shaft 84. The shaft 84 is provided with a pair of conical sockets 90 and 152 at each end thereof. Into these conical sockets 90 and 152 the balls 88 and 118 respectively fit. The ball 88 is held in position by the conical socket 154 in the support member 16 (FIG. 2). The ball 118 is held in position by the conical socket 156 provided in one end 158 of the armature pivot support 120. An additional socket which is generally conical in configuration and shown at 160 is provided intermediate the ends of the armature pivot support 120 and receives the spherical projection 122 on the support member 16. The hook 162 of spring 124 engages an opening 164 provided in the opposite end 166 of the armature pivot support 120. The opposite hook 166 of the spring 124 engages the opening 126 molded into the support member 16. The extension spring 124 is positioned so as to simultaneously bias the armature pivot support 120 against the spherical projection 122 and against the ball 118. This biasing force against the ball 118 is resisted by two reaction forces, the first acting axially through the shaft 84 to the ball 88 and the second acting at right angles to the shaft through one of the eight balls 131 through 138.

It can now be seen that the shaft 84 biased by the spring 124 acting through the armature pivot support 120 and rotated by changes in magnetic flux in stators 98 through 94 becomes a means for sequentially applying a positioning force against the eight balls 131 through 138. By thus sequentially switching currents in the two bifilar wound coils 94 and 96, positioning forces are sequentially applied to the balls 131 through 138 and the carriage 10 is thus moved from any data track position on the floppy disc to any other data track position in accordance with the signals which are applied.

Figure 9:
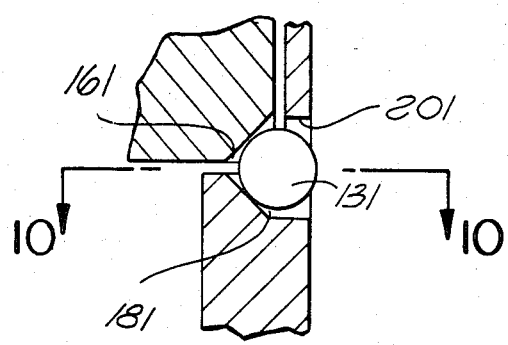
FIG. 9 is a cross-sectional view taken about the lines 9—9 of FIG. 8.
Figure 10:
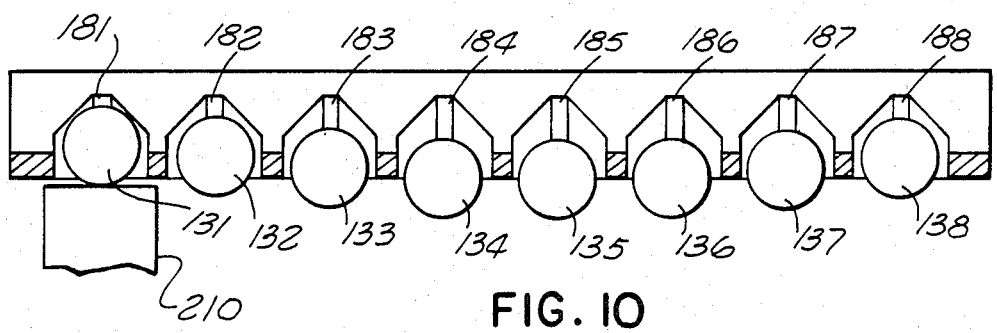
FIG. 10 is a view taken about the lines 10—10 of FIG. 9.
Figure 11:
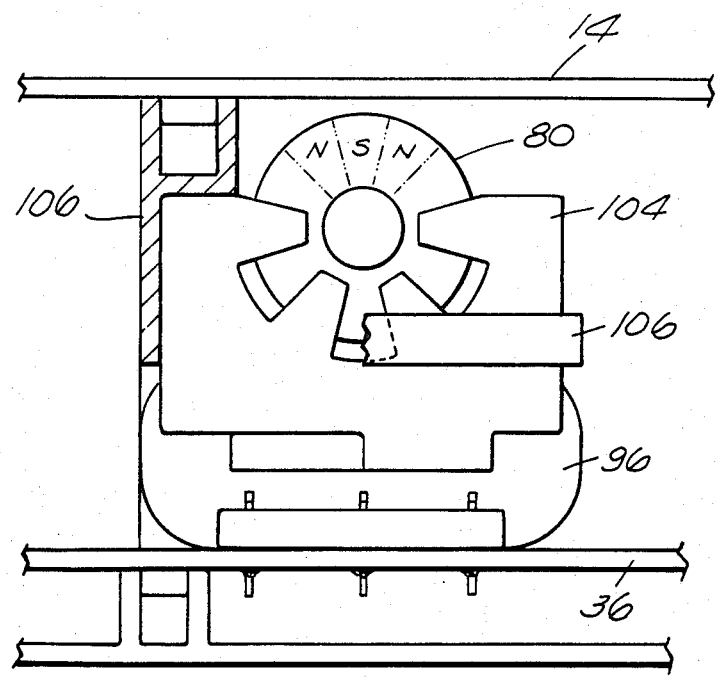
FIG. 11 is a view taken about the line 11—11 of FIG. 2 illustrating the drive motor in further detail.

Reference is now made to FIGS. 8 through 10 wherein the details of the rack 110 on the carriage 10 (the movable rack) and the rack 112 on the support member 16 (the fixed rack) are shown along with an illustration of the manner in which forces are applied to move the movable rack relative to the fixed rack. In the preferred embodiment as illustrated in FIGS. 8 through 10, a series of twenty "V"-shaped notches 161 through 180 are molded into the carriage 10. Each of these "V"-shaped notches include first and second walls 190 and 192 as shown in conjunction with the "V"-shaped notch 180. The walls 190 and 192 slope downwardly toward the surface 194 and are bridged by an additional flat molding surface 196. The eight notches 181 through 188 molded into the fixed rack 112 are constructed in a similar fashion as is shown more clearly in FIG. 10. Preferably, the notches 161 through 180 have a 110 degree dihedral angle and a notch to notch pitch of 0.0833 inches. The eight "V"-shaped notches 181 through 188 on the fixed rack are molded into the support member 16 and also have a dihedral angle of 110 degrees but a notch to notch pitch of 0.09375. Also molded as part of the support member 16 in conjunction with each of the eight notches 181 through 188 is a flange or plate 200 defining retaining pockets 201 through 208. Each of the pockets 201 through 208 is 0.078 inches in diameter such that the pockets will receive a 1/16 inch diameter stainless steel ball therein. Obviously, the dimensions above set forth can vary depending upon the particular application and the diameter of the balls which are to be used to drive the movable carriage.

As illustrated more clearly in FIGS. 9 and 10, the ball 131 is driven upward by a force applying means 210 (for example one of the cams 141 through 148 on the shaft 84) until the ball wedges solidly against four points of contact. Two of those points of contact are on the movable rack 110 and two are on the fixed rack 112. For example, the two flat surfaces of the "V"-shaped notch 181 are opposed the two flat surfaces in "V"-shaped notch 161 (see notch 180 of FIG. 8), and thus provides the four surfaces against which the ball will wedge to provide the four points of contact above-referred to. The action of the force supplying means 210 causes the movable rack 110 to move so that the "V"-shaped notches 161 and 181 align with each other. With this alignment accomplished, the magnetic transducer attached to the carriage 10 is properly aligned with a nominal position of the outermost data track on the rotating disc commonly called in the art, track zero. During this alignment, balls 132 through 138 are allowed to move freely within the pockets 202 through 208 formed in the flange 200.

To position the carriage 10 from track zero to track 1, the force supplying means 210 is withdrawn and at the same time a similar means (not illustrated) applies a similar force against ball 138 in socket 208 thus causing contact between ball 138 and flat surfaces on the "V"-shaped notches 169 and 188. As this is done, the ball 138 first contacts the "V"-shaped notch 169 at point 214 and drives the movable rack 110 and the carriage 10 in the direction shown by the arrow 212. As the ball 138 rotates and moves more deeply into the opposed "V"-shaped notches 188 and 169, contact is finally made at the four points thereon when the ball is fully wedged in place. At this time, carriage 10 motion is stopped almost instantly and the two opposed "V"-shaped notches are aligned. The carriage has been moved 0.0104 inches, when utilizing the various dimensions set forth in accordance with the presently preferred embodiment of the present invention, and the magnetic transducer means attached to the carriage 10 is aligned with data track number 1. It is in this manner that all of the eighty-nine data tracks normally available upon a typical floppy disc are accessed in either direction. That is, by sequentially applying a driving force against the balls 131 through 138 and such may be done in the sequence indicated in the following table:

| FORCING BALL | NOTCH ALIGNMENT | DATA TRACK | MOTOR COIL |
| --- | --- | --- | --- |
| 181 | 181 | 161 | 0 | 1 |
| 188 | 188 | 169 | 1 | 2 |
| 137 | 187 | 168 | 2 | 3 |
| 136 | 186 | 167 | 3 | 4 |
| 135 | 185 | 166 | 4 | 1 |
| 134 | 184 | 165 | 5 | 2 |
| 133 | 183 | 164 | 6 | 3 |
| 132 | 182 | 163 | 7 | 4 |
| 131 | 181 | 162 | 8 | 1 |
| 138 | 188 | 170 | 9 | 2 |
| 137 | 187 | 169 | 10 | 3 |
| 136 | 186 | 168 | 11 | 4 |
| 135 | 185 | 167 | 12 | 1 |
| 134 | 184 | 166 | 13 | 2 |
| 133 | 183 | 165 | 14 | 3 |
| 132 | 182 | 164 | 15 | 4 |
| 131 | 181 | 163 | 16 | 1 |
| 138 | 188 | 171 | 17 | 2 |
| 137 | 187 | 170 | 18 | 3 |
| 136 | 186 | 169 | 19 | 4 |
| 135 | 185 | 168 | 20 | 1 |
| 134 | 184 | 167 | 21 | 2 |
| 133 | 183 | 166 | 22 | 3 |
| 132 | 182 | 165 | 23 | 4 |
| 131 | 181 | 164 | 24 | 1 |
| 138 | 188 | 172 | 25 | 2 |
| 137 | 187 | 171 | 26 | 3 |
| 136 | 186 | 170 | 27 | 4 |
| 135 | 185 | 169 | 28 | 1 |
| 134 | 184 | 168 | 29 | 2 |
| 133 | 183 | 167 | 30 | 3 |
| 132 | 182 | 166 | 31 | 4 |
| 131 | 131 | 165 | 32 | 1 |
| 138 | 138 | 173 | 33 | 2 |
| 137 | 137 | 172 | 34 | 3 |
| 136 | 136 | 171 | 35 | 4 |
| 135 | 135 | 170 | 36 | 1 |
| 134 | 134 | 169 | 37 | 2 |
| 133 | 133 | 168 | 38 | 3 |
| 132 | 132 | 167 | 39 | 4 |
| 131 | 131 | 166 | 40 | 1 |
| 138 | 138 | 174 | 41 | 2 |
| 137 | 137 | 173 | 42 | 3 |
| 136 | 136 | 172 | 43 | 4 |
| 135 | 135 | 171 | 44 | 1 |
| 134 | 134 | 170 | 45 | 2 |
| 133 | 133 | 169 | 46 | 3 |
| 132 | 132 | 168 | 47 | 4 |
| 131 | 131 | 167 | 48 | 1 |
| 138 | 138 | 175 | 49 | 2 |
| 137 | 137 | 174 | 50 | 3 |
| 136 | 136 | 173 | 51 | 4 |
| 135 | 135 | 172 | 52 | 1 |
| 134 | 134 | 171 | 53 | 2 |
| 133 | 133 | 170 | 54 | 3 |
| 132 | 132 | 169 | 55 | 4 |
| 131 | 131 | 168 | 56 | 1 |
| 138 | 138 | 176 | 57 | 2 |
| 137 | 137 | 175 | 58 | 3 |
| 136 | 136 | 174 | 59 | 4 |
| 135 | 135 | 173 | 60 | 1 |
| 134 | 134 | 172 | 61 | 2 |
| 133 | 133 | 171 | 62 | 3 |
| 132 | 132 | 170 | 63 | 4 |
| 131 | 181 | 169 | 64 | 1 |
| 138 | 188 | 177 | 65 | 2 |
| 137 | 187 | 176 | 66 | 3 |

| FORCING BALL | NOTCH ALIGNMENT | DATA TRACK | MOTOR COIL |
|---|---|---|---|
| 136 | 186 | 175 | 67 | 4 |
| 135 | 185 | 174 | 68 | 1 |
| 134 | 184 | 173 | 69 | 2 |
| 133 | 183 | 172 | 70 | 3 |
| 132 | 182 | 171 | 71 | 4 |
| 131 | 181 | 170 | 72 | 1 |
| 138 | 188 | 178 | 73 | 2 |
| 137 | 187 | 177 | 74 | 3 |
| 136 | 186 | 176 | 75 | 4 |
| 135 | 185 | 175 | 76 | 1 |
| 134 | 184 | 174 | 77 | 2 |
| 133 | 183 | 173 | 78 | 3 |
| 132 | 182 | 172 | 79 | 4 |
| 131 | 181 | 171 | 80 | 1 |
| 138 | 188 | 179 | 81 | 2 |
| 137 | 187 | 178 | 82 | 3 |
| 136 | 186 | 177 | 83 | 4 |
| 135 | 185 | 176 | 84 | 1 |
| 134 | 184 | 175 | 85 | 2 |
| 133 | 183 | 174 | 86 | 3 |
| 132 | 182 | 173 | 87 | 4 |
| 131 | 181 | 172 | 88 | 1 |

It will be recognized that the force applying means 210 is one of the cams 114 on the shaft 84. That is, the camshaft 84 which is biased by the extension spring 124 through the armature pivot support 120 and rotated by changes in magnetic flux in stators 98 through 104 becomes a means for sequentially applying the positioning force against the eight balls 131 through 138. By sequentially switching currents in the two bifilar wound coils 94 and 96, positioning forces are sequentially applied to balls 131 through 138 and the carriage 10 is moved from any data track position to any other data track position in accordance with the energization of the coils.

After the carriage 10 has been positioned to a desired data track in response to a sequence of current pulses applied to the bifilar coils 94 and 96, a holding current is temporarily sustained in the last coil energized during the sequence. If this coil is one of the bifilar windings in coil assembly 94 for example, then the electromagnetic flux will interact with permanent magnet 82.

Camshaft 84 initially rotates beyond the selected null position, and then oscillates about that null position until kinetic energy is damped from the system. Since each cam lobe has a 10 degree dwell 150, the effects of this overshoot and oscillation are not imparted to the carriage. Any overshoot or oscillation 10 degrees or less in amplitude, has no effect on the biasing force being applied to the selected ball. Consequently, the carriage reaches the selected position with negligible overshoot, the ball becomes fully seated in the matching "V"-shaped notches with negligible oscillation, and the carriage is at rest at the selected position long before the kinetic energy in the camshaft assembly has been dissipated.

Since the camshaft 84 can stop anywhere on the 10 degree dwell of a given lobe without effecting carriage position, the angular magnitude of the dead band of the stepping motor need not be minimized. Consequently, driving currents can be low, minimizing power requirements and heat generation, air gaps can be wide minimizing expensive precision fits and difficult alignments, and friction levels can be raised to improve reliability during high speed operation.

Similarly, pole shift does not effect carriage position, therefore, there is no need to minimize pole shift, and the materials and processes used in fabricating the magnetic structure of the stepping motor can be selected for maximum economy.

Any shock applied to the carriage 10 might momentarily move the carriage a small distance from the selected position, and in the process force the selected positioning ball and the camshaft 84 to also move a small distance. This shock induced motion by the camshaft would extend the biasing spring 124 which would then return the system to its normal condition as soon as the shock had passed. The accurate retention of a selected position is a function of the force of the extension spring 124 and does not require a steep torque curve from the stepper motor 30. Since linear shock forces applied to the carriage 10 cannot be transmitted to the camshaft 84 as rotary forces, and since the camshaft assembly is inherently balanced, a very low torque is sufficient to prevent unintentional rotation. The permanent magnets 80 and 82 generate a cogging torque when no current is flowing through coils 94 and 96. This cogging torque is sufficient to prevent unintentional rotation, therefore the temporary holding current in the last switched coil is sustained only enough for the oscillations to damp out. It is then switched off, and the permanent magnet provides the holding torque until carriage repositioning is initiated. By turning off this holding current, energy is saved and heat build up in the drive is minimized.

Although the coil assemblies 94 and 96 generate heat only during positioning movements and a few milliseconds thereafter, this heat is still a significant consideration in positioning accuracy. Heat from the coils is conducted through the stators 98 through 104 and radiates across the air gaps into the permanent magnets 80 and 82. From the magnets, the heat is conducted into the camshaft. This heat expands the length of the camshaft, which has no effect on the interaction of the cams and the positioning balls. This heat is also conducted down the length of the camshaft 84 to the cam area 116, but due to the low thermal conductivity of the polyamide and the large surface area of the shaft, the temperature rise at the cam end of the camshaft 84 is quite low, and therefore the distortion of the positioning racks 110 and 112 from heat radiated from the camshaft and conducted from the camshaft by the balls 131 through 138 is negligible.

Since racks 110 and 112 are substantially isolated from heat sources within the drive, they will assume the temperature and humidity of the ambient atmosphere. Since the glass filled polycarbonate from which the racks are manufactured approximates the thermal and hygroscopic expansion of the biaxially oriented polyethylene terphthalate data disc, the pitch of the positioning system expands and contracts with changes in ambient temperature and humidity to match the expansion and contraction of the pitch of the data tracks written on the disc.

If the camshaft 84 is rotated in either direction in excess of the normal travel range, projections 220 or 222 on the carriage 10 will strike projection 224 on armature support 103. Further movement of the carriage will be obstructed, and as a result, the next positioning ball will be unable to fully seat into its pair of "V"-shaped notches, and as a result, the camshaft will be deflected slightly from its normal position by a small extension of spring 124.

Referring to FIG. 8, this action can be illustrated by assuming that carriage 10 has been driven from data track 3 to 2 to 1 to 0 and then beyond 0 in the same direction. The corresponding notch alignments would be then 186-167, 187-168, 188-169 and 181-161. With notches 181 and 161 in alignment as shown in FIG. 8, the carriage is positioned at data track 0. If the camshaft continues to rotate in the same direction, the next drive ball to be activated is 132 and the grooves to be aligned are 182 and 162. However, in this case, we are assuming that the carriage has reached the end of its travel, and as a result, notches 182 and 162 are unable to fully align and therefore drive ball 132 is unable to fully seat in the 182-162 notches and, therefore, the camshaft is radially deflected slightly by the 132 ball acting on the 142 cam. As the camshaft continues to rotate, the 143 cam is brought into contact with the 133 ball and since the 183 and 163 "V"-shaped notches are even further out of alignment, the 133 ball is prevented from seating to an even greater amount than the 132 ball had been. Consequently the camshaft is deflected radially a still greater amount by the 133 ball acting against the 143 cam. Still further rotation brings the 144 cam into contact with the 134 ball, and since the 184 and 164 "V"-shaped notches are in still greater misalignment, the 134 ball is still further away from complete seating, and the 134 ball acting against the 144 cam, deflects the camshaft radially still further. Still further rotation brings the 145 cam into contact with the 135 ball, and since the 185 "V"-shaped notch is evenly positioned between the 165 and 166 "V"-shaped notches, the 135 ball is unable to enter either notch, but bears instead on the shoulder between the two "V" notches. As a result, the camshaft is deflected radially still further by the 135 ball acting on the 145 cam. Still further rotation brings the 146 cam into contact with the 136 ball, and since the 186 notch is somewhat aligned with the 167 notch, the 136 ball can penetrate to some extent into the 136-167 notch combination. As a consequence, the spring 124 can advance the camshaft 84 radially back somewhat toward its normal position. Still further rotation brings the 147 cam into contact with the 137 ball and since the 187 notch is in even better alignment with the 168 notch, the 137 ball is able to penetrate to a still greater amount the 187-168 notch combination. As a consequence, the camshaft advances radially even further back toward its normal position. Still further rotation brings cam 148 into contact with ball 138, and since the 188 notch is nearly aligned with the 169 notch, the 138 ball is able to penetrate into the 188-169 notch combination to an extent where the surface of the 138 ball is acting against the sloping walls of the "V"-shaped notches rather than against the various mold lines of the "V"-shaped notches as is the case during large degrees of mismatch. Because the ball 138 is acting against the side walls of the 188-169 notch combination, the resulting linear force against the carriage is greater than the resisting friction forces, and therefore the carriage is driven in a reverse direction until ball 138 is fully seated in notch combination 188-169, at which point the carriage 10 is positioned again at data track 1. Still further rotation of the camshaft 84 in this direction will then position the carriage 10 in the normal manner at data track 0 with notch combination 181-161 aligned, and still further rotation will again repeat the above cycle. Unlimited rotation of the camshaft is thus possible without damage to the mechanism. Automatic uncoupling of the rotating and sliding elements is provided. The camshaft can be reversed from its direction of excess rotation at any point, and it will quickly and automatically reestablish the normal drive coupling in the opposite direction within a maximum of seven steps.

For illustrative purposes, this description has assumed that the limit of carriage travel is located just beyond the data track zero position. In actual practice, additional travel is normally provided beyond the range of useful data tracks by providing additional "V"-shaped notches in the carriage moving rack 110 such as "V"-shaped notch 180.

During carriage positioning, the camshaft 84 will rotate at more than 800 rpm. It is an advantage of this system that there are no rotational, mechanical stops against which the kinetic energy stored in the rotating camshaft assembly could impact destructively.

Shutter 232 as illustrated in FIG. 2 is a molded extension of carriage 10. Photoelectric sensor assembly 234 is positioned so that shutter 232 interrupts the optical path of sensor 234 when the carriage 10 is positioned at the unused data track position of −2 (i.e. when "V"-shaped notch 183 is aligned with "V"-shaped notch 163). When the system is first turned on, it is necessary to initialize it in order to establish a known carriage position. To accomplish this, when power is first supplied to the unit, a series of current pulses are switched to the bifilar coils in the sequence 4, 3, 2, 1, 4, 3, 2, 1, etc. As shown in Table 9, this sequence causes the carriage to move in the direction from track 88 toward track 0 and beyond. When the carriage passes the −2 track, the signal from the photosensor 234 halts the switching sequence. Due to dimensional tolerances in locating the sensor, this signal may be displaced as much as one and one-half data tracks away from the nominal −2 track. Wherever the switching sequence is when the sensor signal is received, the switching sequence stops at that point, and after a pause of a few milliseconds for partial damping of camshaft oscillations, the coil switching sequence is reversed until coil No. 1 is again energized, at which point the initializing sequence is ended, the "V"-shaped notches 181 and 161 are aligned, and the carriage is positioned at data track zero. After another pause of a few milliseconds to permit complete damping of camshaft oscillations, the temporary holding current is switched off, and the cogging torque of the stepping motor retains the system at data track 0 until commanded to move to another data track. The system is an open loop system, and no further positional information is required as long as current is supplied to the electronics which retains a continuous record of carriage position by means of an up/down counter. An advantage of the invention is the relatively loose tolerance on operation of the photosensor of plus or minus one and one-half tracks (±0.016″) rather than the plus or minus one-half track (±0.005″) of some prior art systems which must discriminate between adjacent tracks rather than every fourth track.

What is claimed is:

1. Magnetic transducer positioning apparatus comprising:
   (a) a carriage carrying magnetic transducer means;
   (b) means for applying a force to said carriage to move said carriage to a predetermined position including:
      (1) a first member having a first plurality of force receiving surfaces of a first predetermined spacing;
      (2) a second member disposed adjacent said first member and having a second plurality of force receiving surfaces of a second predetermined spacing, said second predetermined spacing being different from said first predetermined spacing;

(3) a driving means disposed adjacent said first and second members;

(4) means for moving said driving means into simultaneous engagement with said first and second surfaces for aligning at least one of said second surfaces with one of said first surfaces; and (5) one of said first and second members being substantially fixed relative to the other of said first and second members.

2. Magnetic transducer positioning apparatus as defined in claim 1 wherein said driving means includes a separate driving member for each of said surfaces on said first member.

3. Magnetic transducer apparatus as defined in claim 2 wherein each of said driving members defines a curved surface and said force receiving surfaces on said first and second members are depressions defined by angular walls.

4. Magnetic transducer positioning apparatus as defined in claim 3 wherein said driving members are balls.

5. Magnetic transducer positioning apparatus as defined in claim 4 wherein said walls define flat surfaces.

6. Magentic transducer positioning apparatus as defined in claim 5 wherein each of said force receiving surfaces is a "V"-shaped notch.

7. Magnetic transducer positioning apparatus as defined in claim 2 wherein said means for moving said driving members is a cam means.

8. Magnetic transducer positioning apparatus as defined in claim 7 wherein said cam means is an elongated molded plastic shaft having a plurality of individual cams formed integrally thereon.

9. Magnetic transducer positioning apparatus as defined in claim 8 wherein said means for moving said driving members further includes a stepper motor for rotating said shaft.

10. Magnetic transducer positioning apparatus as defined in claim 9 wherein said shaft is the shaft of said stepper motor.

11. Magnetic transducer positioning apparatus as defined in claim 10 wherein said shaft is positioned for rotation on a single ball disposed at each end thereof and received within a socket formed in said shaft.

12. Magnetic transducer positioning apparatus as defined in claim 11 wherein said stepper motor further includes a pair of permanent magnets securely affixed to said shaft.

13. Magnetic transducer positioning apparatus as defined in claim 11 which further includes a spring loaded arm for receiving one end of said shaft.

14. Magnetic transducer positioning apparatus as defined in claim 13 wherein said arm receives said shaft at one end thereof is supported upon a pivot point intermediate the ends thereof and receives a spring means at the other end thereof biasing said one end toward said shaft.

15. Magnetic transducer positioning apparatus as defined in claim 14 which further includes a plurality of balls contacting each of said first and second surfaces of said carriage and which further includes continuous track defining means restraining said balls for movement along predetermined paths to effectively float said carriage between said balls.

16. Magnetic transducer positioning apparatus as defined in claim 11 which further includes stop means for limiting the travel of said carriage beyond first and second limit positions, said spring loaded arm absorbing displacement of said shaft as said shaft urges said ball against said force receiving surfaces.

17. Magnetic transducer positioning apparatus as defined in claim 7 wherein said cam means has at least a single lobe for actuating one of said driving members at a time.

18. Magnetic transducer positioning apparatus as defined in claim 7 wherein said cam means has a plurality of cam surfaces only one of which at any one time actuates a driving member to align one of said surfaces on said first member with one of said surfaces on said second member.

19. Magnetic transducer positioning apparatus as defined in claim 18 wherein said cam surfaces are carried by an elongated shaft.

20. Magnetic transducer positioning apparatus as defined in claim 19 wherein said cam surfaces are formed as an integral part of said elongated shaft.

21. Magnetic transducer positioning apparatus as defined in claim 2 which further includes means for retaining said driving members aligned with said surface on said first member.

22. Magnetic transducer positioning apparatus as defined in claim 21 wherein said driving members are balls and said surfaces are recesses and said retaining means is a plate defining openings therein receiving said balls, said openings being aligned with the recesses in said first member.

23. Magnetic transducer positioning apparatus as defined in claim 1 wherein said second predetermined spacing is greater than said first predetermined spacing.

24. Magnetic transducer positioning apparatus as defined in claim 1 wherein said second predetermined spacing is less than said first predetermined spacing.

* * * * *

UNITED STATES PATENT AND TRADEMARK OFFICE
CERTIFICATE OF CORRECTION

PATENT NO. : 4,524,400
DATED : June 18, 1985
INVENTOR(S) : Gill Cantwell

It is certified that error appears in the above-identified patent and that said Letters Patent is hereby corrected as shown below:

FIGURE 2, number "234" for the shutter should be --232--.

Column 14, line 12, the table set forth is incorrect.
The correct table is set forth below:

| FORCING BALL | NOTCH ALIGNMENT | | DATA TRACK | MOTOR COIL |
|---|---|---|---|---|
| 131 | 181 | 161 | 0 | 1 |
| 138 | 188 | 169 | 1 | 2 |
| 137 | 187 | 168 | 2 | 3 |
| 136 | 186 | 167 | 3 | 4 |
| 135 | 185 | 166 | 4 | 1 |
| 134 | 184 | 165 | 5 | 2 |
| 133 | 183 | 164 | 6 | 3 |
| 132 | 182 | 163 | 7 | 4 |
| 131 | 181 | 162 | 8 | 1 |
| 138 | 188 | 170 | 9 | 2 |
| 137 | 187 | 169 | 10 | 3 |
| 136 | 186 | 168 | 11 | 4 |
| 135 | 185 | 167 | 12 | 1 |
| 134 | 184 | 166 | 13 | 2 |

UNITED STATES PATENT AND TRADEMARK OFFICE
CERTIFICATE OF CORRECTION

PATENT NO. : 4,524,400
DATED : June 18, 1985
INVENTOR(S) : Gill Cantwell

It is certified that error appears in the above-identified patent and that said Letters Patent is hereby corrected as shown below:

| | | | | |
|---|---|---|---|---|
| 133 | 183 | 165 | 14 | 3 |
| 132 | 182 | 164 | 15 | 4 |
| 131 | 181 | 163 | 16 | 1 |
| 138 | 188 | 171 | 17 | 2 |
| 137 | 187 | 170 | 18 | 3 |
| 136 | 186 | 169 | 19 | 4 |
| 135 | 185 | 168 | 20 | 1 |
| 134 | 184 | 167 | 21 | 2 |
| 133 | 183 | 166 | 22 | 3 |
| 132 | 182 | 165 | 23 | 4 |
| 131 | 181 | 164 | 24 | 1 |
| 138 | 188 | 172 | 25 | 2 |
| 137 | 187 | 171 | 26 | 3 |
| 136 | 186 | 170 | 27 | 4 |
| 135 | 185 | 169 | 28 | 1 |
| 134 | 184 | 168 | 29 | 2 |
| 133 | 183 | 167 | 30 | 3 |

UNITED STATES PATENT AND TRADEMARK OFFICE
CERTIFICATE OF CORRECTION

PATENT NO. : 4,524,400  Page 3 of 6
DATED      : June 18, 1985
INVENTOR(S): Gill Cantwell It is certified that error appears in the above-identified patent and that said Letters Patent is hereby corrected as shown below:

| | | | | |
|---|---|---|---|---|
| 132 | 182 | 166 | 31 | 4 |
| 131 | 181 | 165 | 32 | 1 |
| 138 | 188 | 173 | 33 | 2 |
| 137 | 187 | 172 | 34 | 3 |
| 136 | 186 | 171 | 35 | 4 |
| 135 | 185 | 170 | 36 | 1 |
| 134 | 184 | 169 | 37 | 2 |
| 133 | 183 | 168 | 38 | 3 |
| 132 | 182 | 167 | 39 | 4 |
| 131 | 181 | 166 | 40 | 1 |
| 138 | 188 | 174 | 41 | 2 |
| 137 | 187 | 173 | 42 | 3 |
| 136 | 186 | 172 | 43 | 4 |
| 135 | 185 | 171 | 44 | 1 |
| 134 | 184 | 170 | 45 | 2 |
| 133 | 183 | 169 | 46 | 3 |
| 132 | 182 | 168 | 47 | 4 |

UNITED STATES PATENT AND TRADEMARK OFFICE
CERTIFICATE OF CORRECTION

PATENT NO. : 4,524,400 Page 4 of 6
DATED : June 18, 1985
INVENTOR(S) : Gill Cantwell It is certified that error appears in the above-identified patent and that said Letters Patent is hereby corrected as shown below:

| | | | | |
|---|---|---|---|---|
| 131 | 181 | 167 | 48 | 1 |
| 138 | 188 | 175 | 49 | 2 |
| 137 | 187 | 174 | 50 | 3 |
| 136 | 186 | 173 | 51 | 4 |
| 135 | 185 | 172 | 52 | 1 |
| 134 | 184 | 171 | 53 | 2 |
| 133 | 183 | 170 | 54 | 3 |
| 132 | 182 | 169 | 55 | 4 |
| 131 | 181 | 168 | 56 | 1 |
| 138 | 188 | 176 | 57 | 2 |
| 137 | 187 | 175 | 58 | 3 |
| 136 | 186 | 174 | 59 | 4 |
| 135 | 185 | 173 | 60 | 1 |
| 134 | 184 | 172 | 61 | 2 |
| 133 | 183 | 171 | 62 | 3 |
| 132 | 182 | 170 | 63 | 4 |
| 131 | 181 | 169 | 64 | 1 |

UNITED STATES PATENT AND TRADEMARK OFFICE
CERTIFICATE OF CORRECTION

PATENT NO. : 4,524,400
DATED : June 18, 1985
INVENTOR(S) : Gill Cantwell

It is certified that error appears in the above-identified patent and that said Letters Patent is hereby corrected as shown below:

| | | | | |
|---|---|---|---|---|
| 138 | 188 | 177 | 65 | 2 |
| 137 | 187 | 176 | 66 | 3 |
| 136 | 186 | 175 | 67 | 4 |
| 135 | 185 | 174 | 68 | 1 |
| 134 | 184 | 173 | 69 | 2 |
| 133 | 183 | 172 | 70 | 3 |
| 132 | 182 | 171 | 71 | 4 |
| 131 | 181 | 170 | 72 | 1 |
| 138 | 188 | 178 | 73 | 2 |
| 137 | 187 | 177 | 74 | 3 |
| 136 | 186 | 176 | 75 | 4 |
| 135 | 185 | 175 | 76 | 1 |
| 134 | 184 | 174 | 77 | 2 |
| 133 | 183 | 173 | 78 | 3 |
| 132 | 182 | 172 | 79 | 4 |
| 131 | 181 | 171 | 80 | 1 |
| 138 | 188 | 179 | 81 | 2 |

UNITED STATES PATENT AND TRADEMARK OFFICE
CERTIFICATE OF CORRECTION

PATENT NO. : 4,524,400  Page 6 of 6
DATED : June 18, 1985
INVENTOR(S) : Gill Cantwell It is certified that error appears in the above-identified patent and that said Letters Patent is hereby corrected as shown below:

| 137 | 187 | 178 | 82 | 3 |
| 136 | 186 | 177 | 83 | 4 |
| 135 | 185 | 176 | 84 | 1 |
| 134 | 184 | 175 | 85 | 2 |
| 133 | 183 | 174 | 86 | 3 |
| 132 | 182 | 173 | 87 | 4 |
| 131 | 181 | 172 | 88 | 1 |

Signed and Sealed this

Twenty-ninth Day of July 1986

[SEAL]

Attest:

DONALD J. QUIGG

Attesting Officer      Commissioner of Patents and Trademarks